United States Patent
Chen et al.

(10) Patent No.: US 10,430,913 B2
(45) Date of Patent: Oct. 1, 2019

(54) APPROXIMATING IMAGE PROCESSING FUNCTIONS USING CONVOLUTIONAL NEURAL NETWORKS

(71) Applicant: INTEL CORPORATION, Santa Clara, CA (US)

(72) Inventors: Qifeng Chen, Stanford, CA (US); Jia Xu, Santa Clara, CA (US); Vladlen Koltun, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 264 days.

(21) Appl. No.: 15/639,000

(22) Filed: Jun. 30, 2017

(65) Prior Publication Data

US 2019/0005603 A1    Jan. 3, 2019

(51) Int. Cl.
*G06T 1/20* (2006.01)
*G06T 5/00* (2006.01)

(52) U.S. Cl.
CPC .............. *G06T 1/20* (2013.01); *G06T 5/002* (2013.01); *G06T 5/003* (2013.01); *G06T 2207/20081* (2013.01); *G06T 2207/20084* (2013.01)

(58) Field of Classification Search
CPC ................. G06T 1/20; G06T 5/002; G06T 5/003; G06T 2207/20084; G06T 2207/20081
See application file for complete search history.

(56) References Cited

U.S. PATENT DOCUMENTS

| | | | |
|---|---|---|---|
| 2017/0256033 A1* | 9/2017 | Tuzel | G06T 5/00 |
| 2018/0032846 A1* | 2/2018 | Yang | G06K 9/00711 |
| 2018/0341495 A1* | 11/2018 | Culurciello | G06F 9/3895 |

OTHER PUBLICATIONS

Chen, J., et al., "Bilateral Guided Upsampling", ACM Trans. Graph., Nov. 2016,. vol. 35, 8 pages.
Gharbi, M., et al., "Deep joint demosaicking and denoising", ACM Transaction s on Graphics, Nov. 2016, vol. 35, XXXpages.
Isola, P., et al., "Image-to-Image Translation with Conditional Adversarial Networks", Nov. 21, 2016, arXiv:1611.07004, 16 pages.
(Continued)

*Primary Examiner* — Phuoc Tran
(74) *Attorney, Agent, or Firm* — Finch & Maloney PLLC

(57) ABSTRACT

Techniques are provided for approximating image processing functions using convolutional neural networks (CNNs). A methodology implementing the techniques according to an embodiment includes performing, by a CNN, a sequence of non-linear operations on an input image to generate an output image. The generated output image approximates the application of a targeted image processing operator to the input image. The CNN is trained on pairs of training input and output images, wherein the training output images are generated by application of the targeted image processing operator to the training input images. The CNN training process generates bias parameters and convolutional kernel parameters to be employed by the CNN for processing of intermediate image layers associated with processing stages between the input image and the output image, each of the processing stages associated with one of the sequence of non-linear operations. The parameters are associated with the targeted image processing operator.

24 Claims, 6 Drawing Sheets

(56) References Cited

OTHER PUBLICATIONS

Johnson, J., et al., "Perceptual Losses for Real-Time Style Transfer and Super-Resolution", 2016, ECCV, 17 pages.
Liu, S., et al., "Learning Recursive Filters for Low-Level Vision via a Hybrid Neural Network", 2016, ECCV, 16 pages.
Long, J., et al., "Fully Convolutional Networks for Semantic Segmentation", 2015, CVPR, 10 pages.
Maas, A., et al., "Rectifier Nonlinearities Improve Neural Network Acoustic Models", 2013, ICML, 6 pages.
Ronneberger, O., et al., "U-Net: Convolutional Networks for Biomedical Image Segmentation", May 18, 2015, arXiv:1505.04597, 8 pages.
Xu, L., et al., "Deep Edge-Aware Filters", 2015, ICML, 10 pages.
Yu, F. and V. Koltun, "Multi-Scale Context Aggregation by Dilated Convolutions", Apr. 30, 2016, ICLR, 13 pages.

* cited by examiner

APPROXIMATING IMAGE PROCESSING FUNCTIONS USING CONVOLUTIONAL NEURAL NETWORKS

BACKGROUND

Image processing and photographic enhancement applications often involve the execution of relatively complex imaging operators which can consume significant computational resources. These operators or functions, may include, for example, de-noising, de-blurring, smoothing, image enhancement, and the like, which can enhance detail and improve the visual style of the image, for example by imitating the techniques of a master photographer. Existing attempts to improve the efficiency of these complex image processing operations have had relatively limited success. Such attempts are typically operator-specific and often require some form of resolution reduction (e.g., downsampling and up sampling), resulting in reduced image quality.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Figure 1:
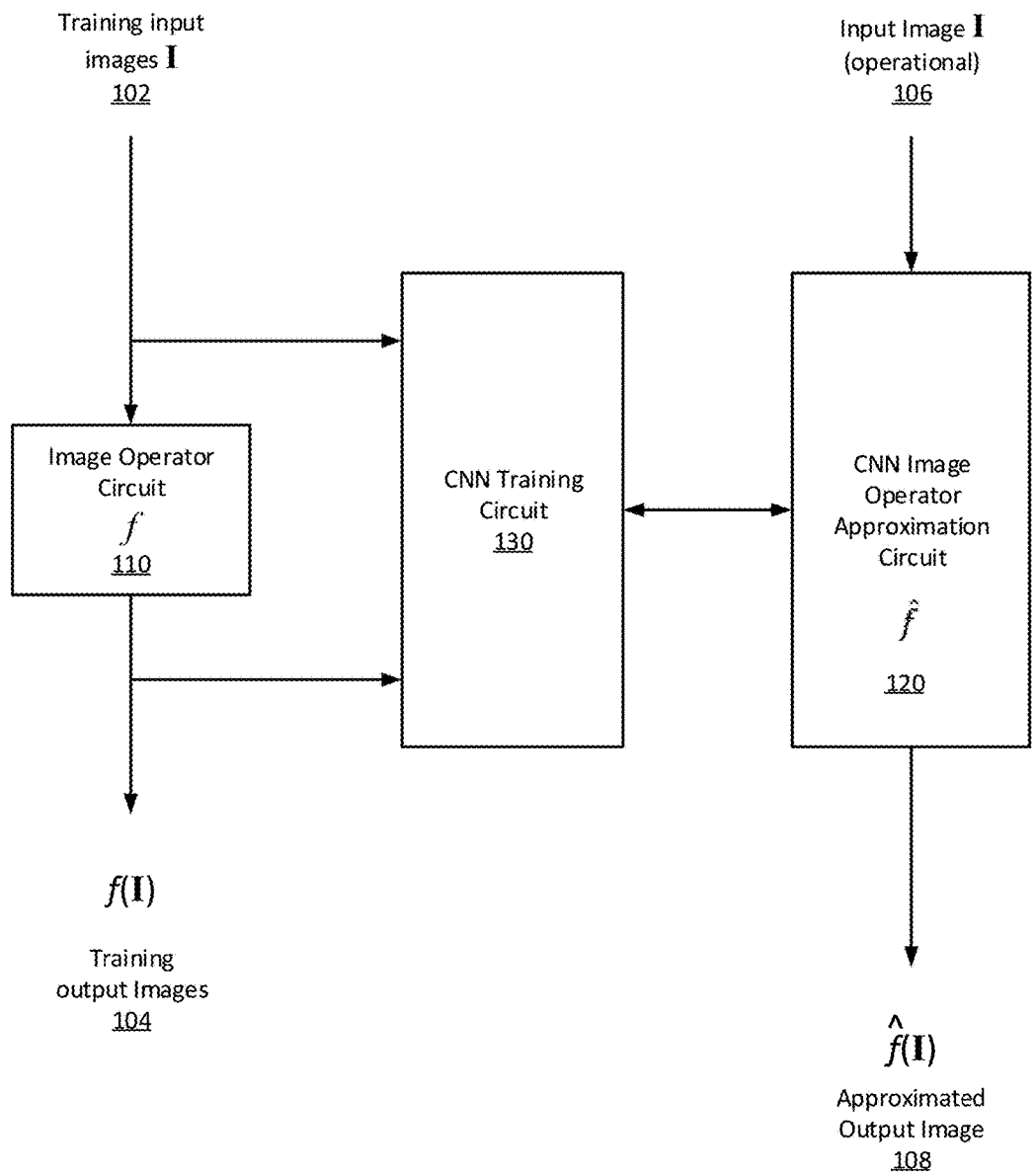
FIG. 1 is a top-level block diagram of an image processing function approximation system, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for approximating image processing functions or operators using convolutional neural networks (CNNs), and for training of the CNNs. Many photographic or image processing operators are based on computationally complex algorithms including, for example, variational methods, gradient-domain processing, high-dimensional filtering, and manipulation of multiscale representations. The disclosed techniques allow for a more efficient implementation of these image processing operators by approximating their results through the application of a CNN that has been trained on input-output image pairs that demonstrate the action or effects of these operators. After training is completed, the original computationally intensive image processing operator need not be run again. In some embodiments, the CNN architecture provides context aggregation, where the computation of each output pixel is dependent on both near and far neighboring pixels, to improve performance on higher-resolution images, as will be described in greater detail below.

The disclosed techniques can be implemented, for example, in a computing system or a software product executable or otherwise controllable by such systems, although other embodiments will be apparent. The system or product is configured to approximate, using one or more CNNs, the results or effects of the application of relatively complex image processing operators to subject images. In accordance with an embodiment, a methodology to implement these techniques includes performing, by a CNN, a sequence of non-linear operations on an input image to generate an output image. The generated output image approximates the application of a targeted image processing operator to the input image. The CNN is trained on pairs of training input and output images, wherein the training output images are generated by application of the targeted image processing operator to the training input images. The CNN training process generates bias parameters and convolutional kernel parameters to be employed by the CNN for processing of intermediate image layers associated with processing stages between the input image and the output image. Each of the processing stages is associated with one of the sequence of non-linear operations, as will be explained in greater detail below. The parameters for each stage, generated by the training, are tailored to the targeted image processing operator.

As will be appreciated, the techniques described herein may allow for the approximation of image processing operators with greater efficiency compared to existing methods that employ the actual image processing operators or attempt to approximate those operators with reduced resolution techniques. The disclosed techniques can be implemented on a broad range of platforms including laptops, tablets, smart phones, workstations, personal assistant systems, and embedded devices. These techniques may further be implemented in hardware or software or a combination thereof.

FIG. 1 is a top-level block diagram 100 of a system configured to approximate targeted image processing functions, in accordance with certain embodiments of the present disclosure. The system 100 is shown to include an image operator circuit 110, a CNN training circuit 130, and a CNN image operator approximation circuit 120. At a high level, the system 100 provides a capability to perform computationally intensive image processing functions with improved efficiency and reduced consumption of computing resources. In some embodiments, the system may be incorporated in a mobile platform such as a smart phone, tablet, laptop, or digital camera.

The image operator circuit 110 is configured to perform a targeted image processing operation, f, on a training input image I 102, to generate a training output image f(I) 104. The targeted image processing operation is the operation for which a CNN generated approximation is desired. Examples of targeted image processing operations include, but are not limited to, de-noising, de-blurring, variational image smoothing, adaptive tone and detail enhancement, photographic style transfer, non-photorealistic stylization, de-mosaicking and nonlocal dehazing. Such operations may employ computationally complex algorithms including, for example, variational methods, gradient-domain processing, high-dimensional filtering, and manipulation of multiscale representations. The image operator circuit 110 performs the targeted image processing operation as a part of the CNN training, as described below, but is not otherwise used during the subsequent execution of the CNN for approximation of the image operator.

The CNN training circuit 130 is configured to receive training image pairs (input images 102 and output images 104) that demonstrate the desired actions or effects of the targeted image processing operator f 110. The training input images are selected to provide a broad representation of scenes, subjects, and lighting conditions. The associated training output images are generated by application of the image operator circuit 110 to the training input images. The training image pairs may be generated during training or may be provided from a training database or other suitable source.

The CNN training circuit 130 is further configured to generate parameters for the CNN, including bias parameters and convolutional kernel parameters. The parameter generation is based on a mean-squared-error minimization process as will be described in greater detail below in connection with FIG. 3. Different parameter sets are generated for different targeted image operators.

The CNN image operator approximation circuit 120 is configured to perform a sequence of non-linear operations on an operational input image 106 to generate an output image 108 that approximates the targeted image processing operation on the input image. The operation of the CNN circuit 120, which is controlled at least in part by the parameters provided during training, occurs in a number of stages, as will be described in greater detail below in connection with FIG. 2. Each stage generates intermediate image layers 402, as illustrated in FIG. 4, for which contextual information is aggregated over pixels at varying distance scales that increase exponentially from one stage to the next.

Figure 2:
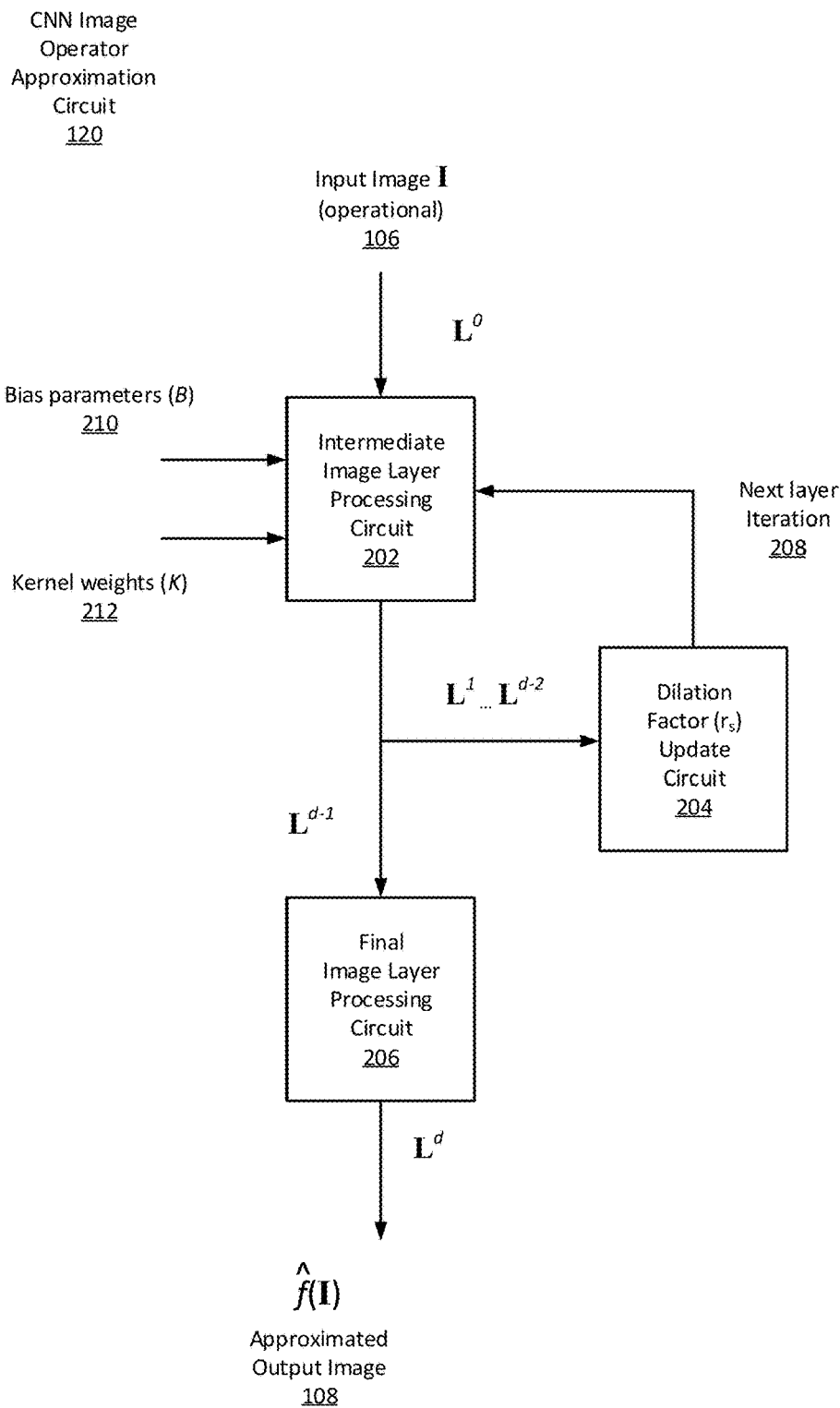
FIG. 2 is a more detailed block diagram of a CNN image operator approximation circuit, configured in accordance with certain embodiments of the present disclosure.

FIG. 2 is a more detailed block diagram of a CNN image operator approximation circuit 120, configured in accordance with certain embodiments of the present disclosure. The CNN image operator approximation circuit 120 is shown to include an intermediate image layer processing circuit 202, a dilation factor update circuit 204, and a final image layer processing circuit 206.

Figure 4:
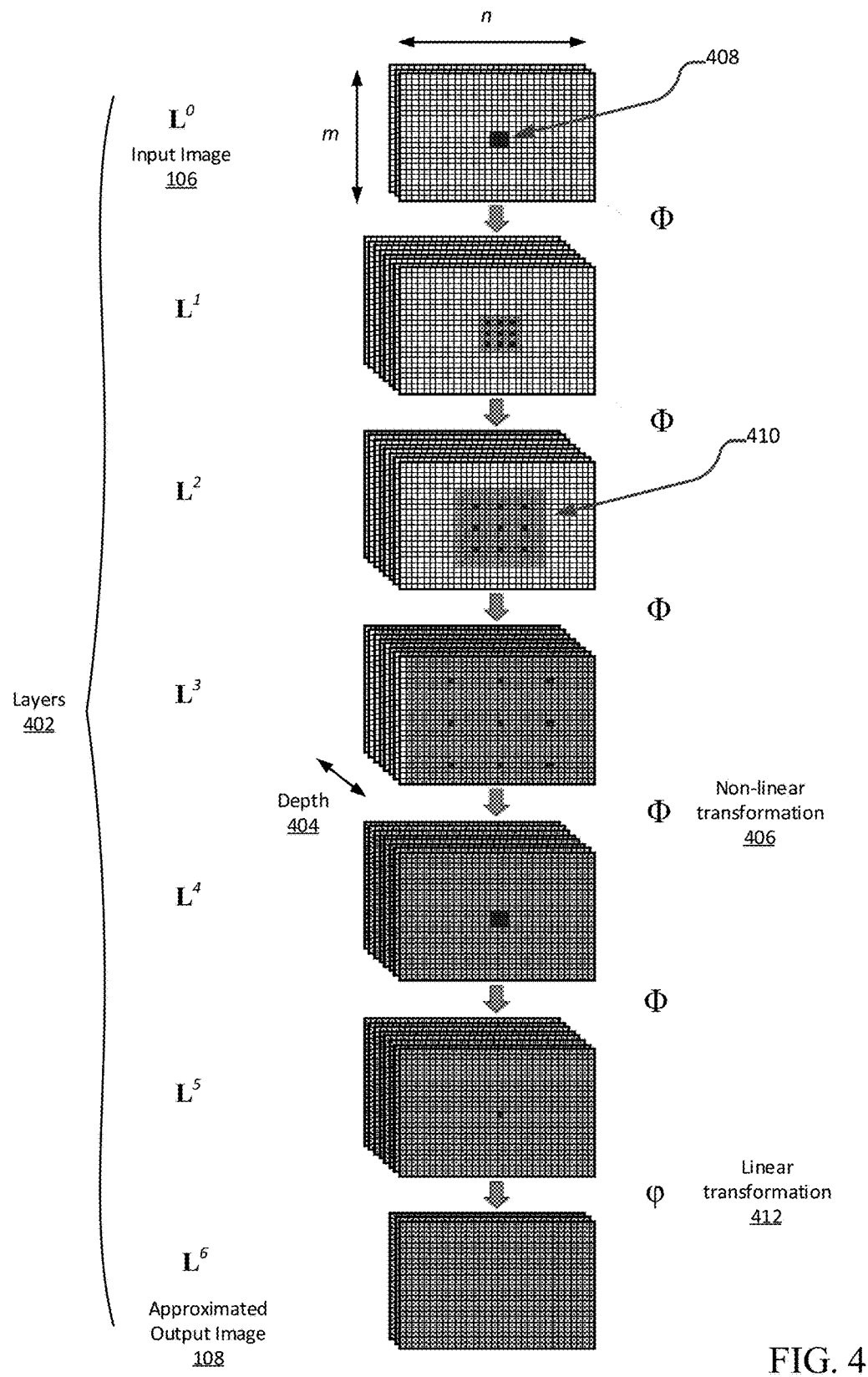
FIG. 4 illustrates the image layers of processing stages of the CNN, in accordance with certain embodiments of the present disclosure.

With reference now to both FIGS. 2 and 4, the intermediate image layer processing circuit 202 is configured to accept the operational input image I 106, also referred to as image layer 0 ($L^0$), and perform a first stage of processing to generate a first intermediate image layer 1 ($L^1$). The input image layer ($L^0$) is of dimension m×n×3, where m×n specifies the resolution of the provided image (which is unrestricted), and 3 represents the red, green, and blue (RGB) image planes for that image. It is additionally noted that the output image layer ($L^6$) is also of dimension m×n×3.

The processing is based on calculations using the bias parameters (B) 210 and convolutional kernel weights (K) 212, as will be explained below, which are specific to each stage and are provided during the CNN training for the image operator to be approximated. The intermediate layer $L^1$ is fed back to circuit 202 which performs a second stage of processing, using the next set of parameters B and K (along with an updated dilation parameter $r_s$), to generate a second intermediate layer $L^2$. The process continues through subsequent stages, in an iterative manner, generating additional intermediate image layers $L^3$ through $L^{d-1}$ and a final output image layer $L^d$ 108. In the example illustrated in FIG. 4, d=6, but in general, any number of layers may be employed.

The processing at each stage, s, to generate an intermediate image layer $L^s$ from a previous layer $L^{s-1}$, may be described by the following equation:

$$L_i^s = \Phi\left(b_i^s + \sum_j L_j^{s-1} *_{r_s} K_{i,j}^s\right)$$

Each intermediate image layer, for s ranging from 1 to d−1, is of dimension m×n×w, where w represents the number of feature maps for that layer also referred to as the depth 404 of the layer. Here, $L_i^s$ is the $i^{th}$ feature map plane of intermediate image layer $L^s$, and $L_j^{s-1}$ is the $j^{th}$ feature map of intermediate image layer $L^{s-1}$. Additionally, $b_i^s$ is a scalar bias from the set of bias parameters B 210 and $K_{i,j}^s$ is a 3×3 convolutional kernel from the set of kernel weights K 212. Expressed differently, $B = \{b_i^s\}_{s,i}$, and $K = \{K_{i,j}^s\}_{s,i,j}$ The Φ operator 406 is a point-wise or pixel-wise nonlinear transformation operator. In some embodiments, the Leaky Rectified Linear Unit (LReLU) operator is employed. This operator can be expressed mathematically as:

$\Phi(x) = \max(\alpha x, x)$, where $\alpha = 0.2$

The operator $*_{r_s}$ is a dilated convolution with dilation factor $r_s$. The dilated convolution operator provides a means by which the network aggregates more distant contextual information without losing resolution. More specifically, for any given image coordinate x (e.g., representing a pixel within the m×n×w space):

$$(L_j^{s-1} *_{r_s} K_{i,j}^s)(x) = \sum_{x=a+r_s b} L_j^{s-1}(a) K_{i,j}^s(b)$$

The effect of the dilation is that the filter is tapped at locations separated by the dilation factor $r_s$ rather than at adjacent locations in the feature map.

The dilation factor update circuit 204 is configured to update or exponentially increase the dilation factor at each processing stage. For example, in some embodiments $r_s = 2^{s-1}$, for $1 \leq s \leq d-2$. For the d−1 layer, no dilation is used. Thus, contextual information is gradually aggregated at increasingly larger scales, such that the computation of each output pixel takes into account all input pixels within a window of size that grows exponentially with the network's depth. This accomplishes global information aggregation for high resolution images with a relatively small parameterization.

The final image layer processing circuit 206 is configured to perform the final processing stage on image layer $L^{d-1}$ to generate the output image $L^d$ 108. The processing of this stage is similar to the processing of the previous intermediate image layer stages, with the exception that a linear transformation φ 412 (a 1×1 convolution without nonlinearity) is used to project the final feature map layers into the RGB color space.

Referring again to FIG. 4, in this example the depth d=6 and the width w=8. The dilation is increased from $r_1 = 1$ in $L^1$ to $r_4 = 8$ in $L^4$. The commensurate growth in the receptive field of each element in each layer is illustrated in the figure, where the darker shaded pixels 408 show the application of dilated convolutions, and the lighter shaded pixels 410 show the receptive field of a single element.

In some embodiments, the number of layers d is selected to be 10, and the number of feature maps w is selected to be 32. This provides a receptive field of 513×513 in the final layers of the network and provides relatively accurate modeling of global image processing operators, while allowing for the total number of parameters to be relatively small, at approximately 75000.

The disclosed techniques also allow for a relatively small memory footprint. Since there are no connections between nonconsecutive layers, only two fixed-sized memory buffers are needed at any one time to store the current and previous image layers.

Figure 3:
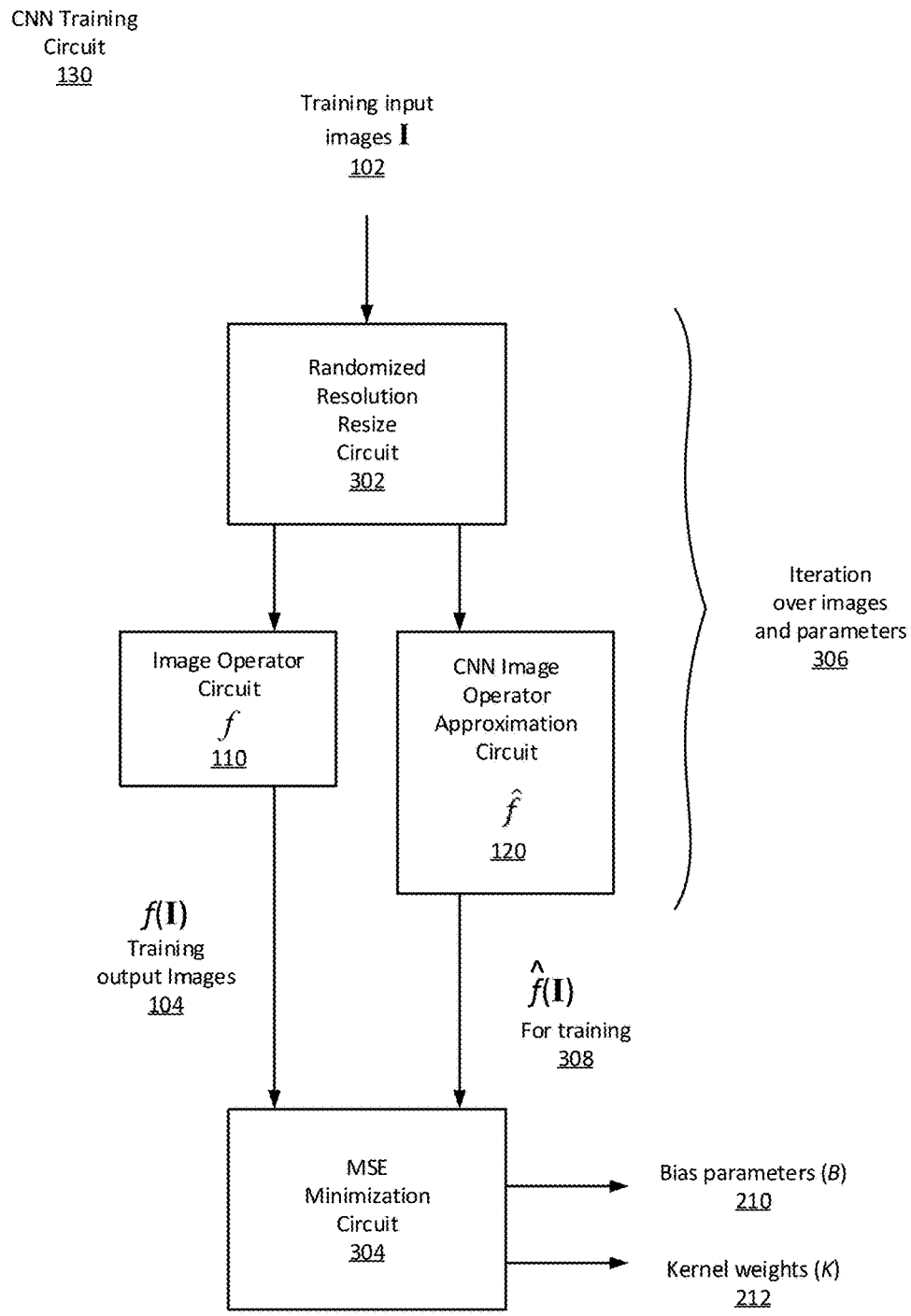
FIG. 3 is a more detailed block diagram of a CNN training circuit, configured in accordance with certain embodiments of the present disclosure.

FIG. 3 is a more detailed block diagram of a CNN training circuit 130, configured in accordance with certain embodiments of the present disclosure. CNN training circuit 130 is shown to include a randomized resolution resize circuit 302 and an MSE minimization circuit 304. The CNN training circuit 130 is also shown to employ the image operator circuit 110 and the CNN image operator approximation circuit 120. At a high level, the CNN training circuit 130 is configured to generate bias and convolutional kernel parameters for the CNN, based on a mean-squared-error minimization process between the CNN image operator approximation and the actual targeted image operator.

In some embodiments, the randomized resolution resize circuit 302 is configured and provided to perform a random resolution resize of the training input image 102 so that the training encompasses a broad range of image resolutions. The resized training input images are provided to the image operator circuit 110 and the CNN image operator approximation circuit 120 for many training iterations 306, over a relatively large number of training images and for a relatively large number of parameter configurations.

The MSE minimization circuit 304 is configured to operate on the resulting training output images f(I) 104 and f̂(I) 308 and calculate K 212 and B 210 parameters that minimize the MSE and are optimized to fit the action of the operator f across all images of the training set. In some embodiments, the MSE minimization can be expressed as an image-space regression loss:

$$l(K, B) = \sum_i \frac{1}{N_i} \left\| \hat{f}(I_i; K, B) - f(I_i) \right\|^2$$

Where $N_i$ is the number of pixels in image $I_i$. This measure of loss optimizes the relatively simplistic MSE in the RGB color space across the training set. In some embodiments, different measures may be used such as, for example, perceptual loss measurements.

As previously described, the training set of input/output image pairs may be generated off-line by applying the original targeted image operator to relatively large data sets in an automated fashion, for example without human intervention.

Methodology

Figure 5:
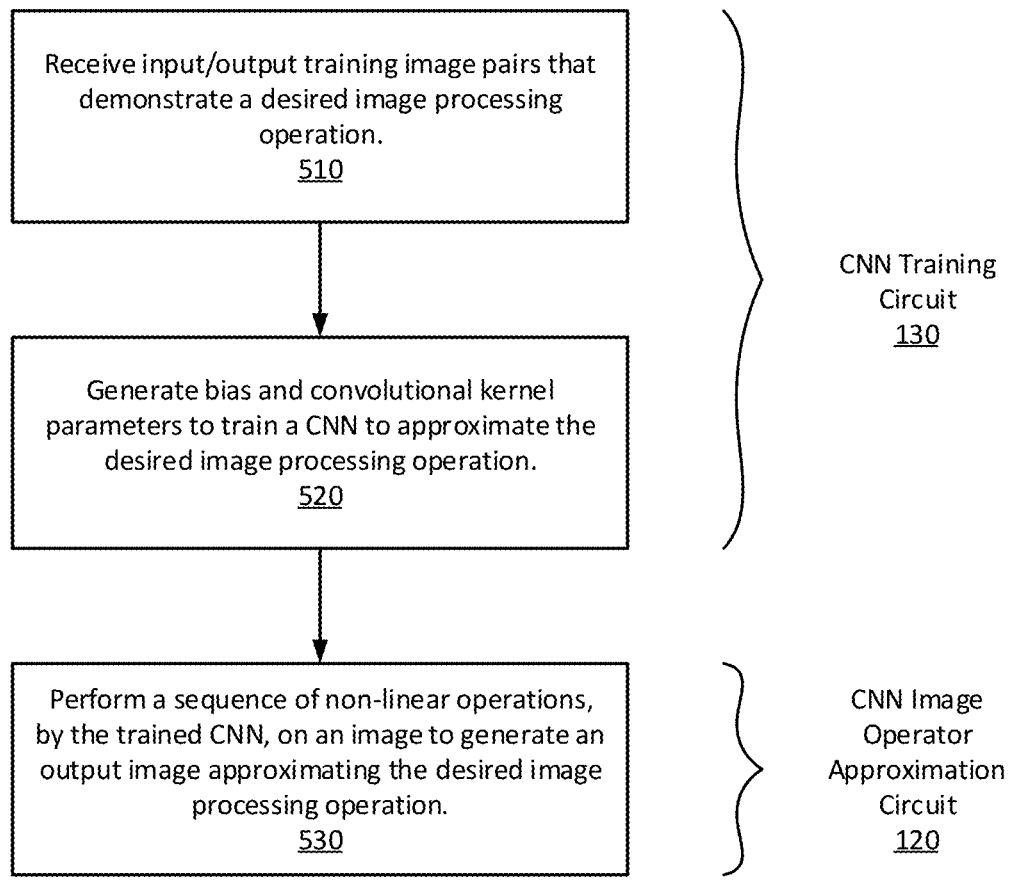
FIG. 5 is a flowchart illustrating a methodology for approximating image processing functions, in accordance with certain embodiments of the present disclosure.

FIG. 5 is a flowchart illustrating an example method 500 for approximating image processing functions using a CNN, in accordance with certain embodiments of the present disclosure. As can be seen, the example method includes a number of phases and sub-processes, the sequence of which may vary from one embodiment to another. However, when considered in the aggregate, these phases and sub-processes form a process for approximating image processing functions in accordance with certain of the embodiments disclosed herein. These embodiments can be implemented, for example using the system architecture illustrated in FIGS. 1-3 as described above. However other system architectures can be used in other embodiments, as will be apparent in light of this disclosure. To this end, the correlation of the various functions shown in FIG. 5 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 500. Thus, other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 5, in an embodiment, method 500 for approximating image processing functions commences, at operation 510, by receiving training image pairs (input training images and associated output training images) that demonstrate the effects of a targeted (e.g., desired) image processing operator or function.

Next, at operation 220, CNN parameters, including bias parameters and convolutional kernel parameters, are generated to train the CNN to approximate the targeted image processing operation. The parameters are employed by the CNN for processing of intermediate image layers, associated with CNN processing stages, between an operational input image and an output image.

At operation 530, the trained CNN is deployed to perform a sequence of non-linear operations on an operational input image to generate an output image that approximates the targeted image processing operation on the input image. At each stage of processing, the CNN aggregates contextual information over pixels of the intermediate image layers, at varying distance scales that increase exponentially with each stage.

Of course, in some embodiments, additional operations may be performed, as previously described in connection with the system. For example, the CNN training may further include the operation of generating the bias parameters and the convolutional kernel parameters based on a minimization of mean-squared-error between the CNN output image approximation and the training output images. Additionally, a randomized resolution resizing operation may be applied to the training input images prior to performing the training. In some embodiments, the non-linear operation may be implemented as a Leaky Rectified Linear Unit (LReLU) operation.

Example System

Figure 6:
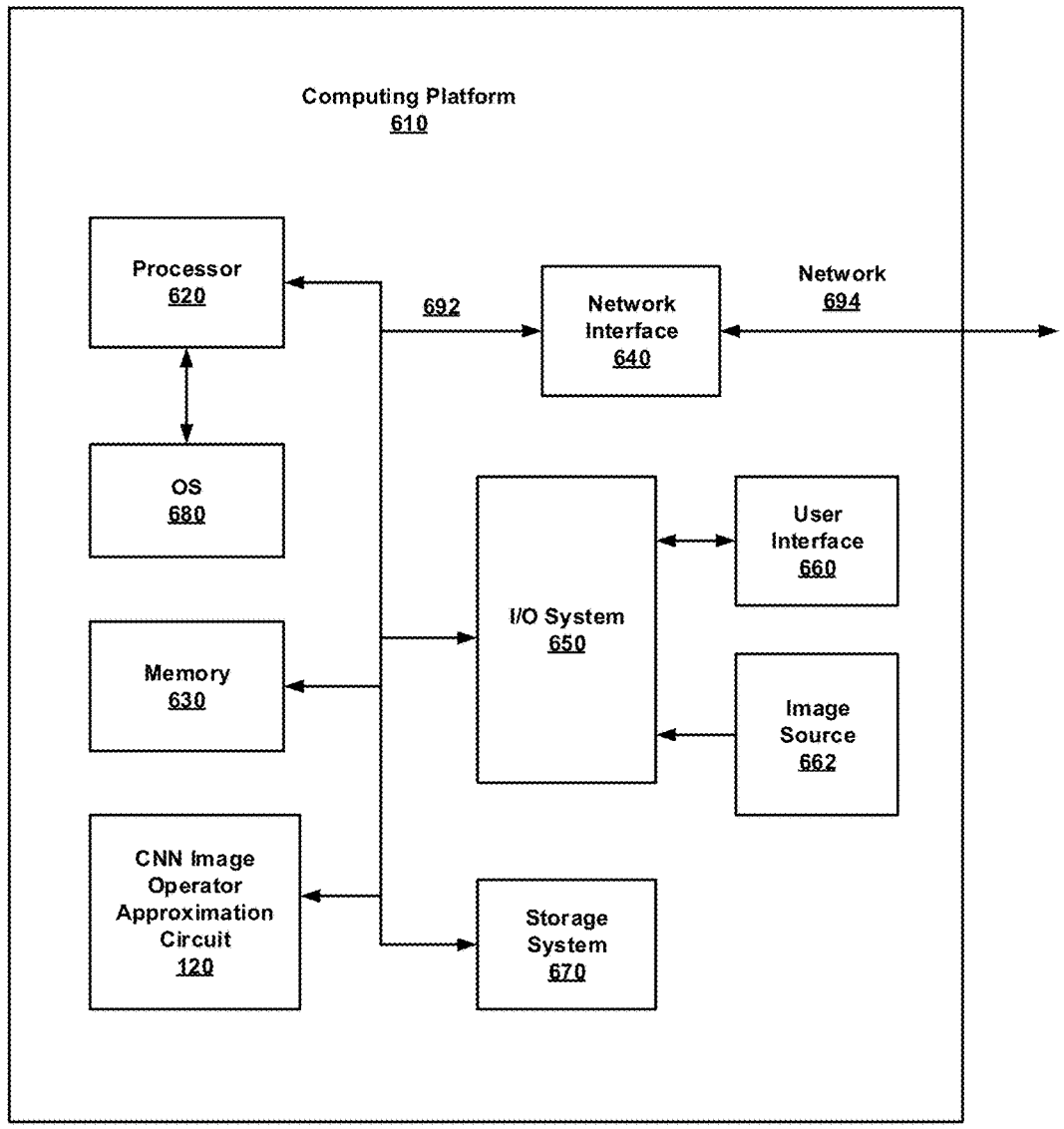
FIG. 6 is a block diagram schematically illustrating a computing platform configured to approximate image processing functions, in accordance with certain embodiments of the present disclosure.

FIG. 6 illustrates an example system 600 to perform approximation of image processing functions, configured in accordance with certain embodiments of the present disclosure. In some embodiments, system 600 comprises a computing platform 610 which may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, and so forth. Any combination of different devices may be used in certain embodiments.

In some embodiments, platform 610 may comprise any combination of a processor 620, a memory 630, CNN image operator approximation circuit 120, a network interface 640, an input/output (I/O) system 650, a user interface 660, an image source 662, and a storage system 670. As can be further seen, a bus and/or interconnect 692 is also provided to allow for communication between the various components listed above and/or other components not shown. Platform 610 can be coupled to a network 694 through network interface 640 to allow for communications with other computing devices, platforms, or resources. Other componentry and functionality not reflected in the block diagram of FIG. 6 will be apparent in light of this disclosure, and it will be appreciated that other embodiments are not limited to any particular hardware configuration.

Processor 620 can be any suitable processor, and may include one or more coprocessors or controllers, such as an audio processor, a graphics processing unit, or hardware accelerator, to assist in control and processing operations associated with system 600. In some embodiments, the processor 620 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 620 may be implemented as a complex instruction set computer (CISC) or a reduced instruction set computer (RISC) processor. In some embodiments, processor 620 may be configured as an x86 instruction set compatible processor.

Memory 630 can be implemented using any suitable type of digital storage including, for example, flash memory and/or random access memory (RAM). In some embodiments, the memory 630 may include various layers of memory hierarchy and/or memory caches as are known to those of skill in the art. Memory 630 may be implemented as a volatile memory device such as, but not limited to, a RAM, dynamic RAM (DRAM), or static RAM (SRAM) device. Storage system 670 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 670 may comprise technology to increase the storage performance enhanced protection for valuable digital media when multiple hard drives are included.

Processor 620 may be configured to execute an Operating System (OS) 680 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with system 600, and therefore may also be implemented using any suitable existing or subsequently-developed platform.

Network interface circuit 640 can be any appropriate network chip or chipset which allows for wired and/or wireless connection between other components of computer system 600 and/or network 694, thereby enabling system 600 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 650 may be configured to interface between various I/O devices and other components of computer system 600. I/O devices may include, but not be limited to, user interface 660 and image source 662 (e.g., a camera, imaging sensor, image database, or other suitable source). User interface 660 may include devices (not shown) such as a display element, touchpad, keyboard, mouse, and speaker, etc. I/O system 650 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 620 or any chipset of platform 610.

It will be appreciated that in some embodiments, the various components of the system 600 may be combined or integrated in a system-on-a-chip (SoC) architecture. In some embodiments, the components may be hardware components, firmware components, software components or any suitable combination of hardware, firmware or software.

CNN image operator approximation circuit 120 is configured to approximate targeted/desired image processing functions using convolutional neural networks (CNNs), as described previously. CNN image operator approximation circuit 120 may include any or all of the circuits/components illustrated in FIGS. 1-3, as described above. These components can be implemented or otherwise used in conjunction with a variety of suitable software and/or hardware that is coupled to or that otherwise forms a part of platform 610. These components can additionally or alternatively be implemented or otherwise used in conjunction with user I/O devices that are capable of providing information to, and receiving information and commands from, a user.

In some embodiments, these circuits may be installed local to system 600, as shown in the example embodiment of FIG. 6. Alternatively, system 600 can be implemented in a client-server arrangement wherein at least some functionality associated with these circuits is provided to system 600 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 694 or remotely coupled to network 694 by one or more other networks and/or communication channels. In some cases, access to resources on a given network or computing system may require credentials such as usernames, passwords, and/or compliance with any other suitable security mechanism.

In various embodiments, system 600 may be implemented as a wireless system, a wired system, or a combination of both. When implemented as a wireless system, system 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the image operator approximation methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 694. In other embodiments, the functionalities disclosed herein can be incorporated into other software applications, such as, for example, photographic manipulation applications, entertainment systems, and image processing applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments system 600 may comprise additional, fewer, or alternative subcomponents as compared to those included in the example embodiment of FIG. 6.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for approximating an image processing operator. The method comprises: performing, by a convolutional neural network (CNN), a sequence of non-linear operations on an input image to generate an output image, the output image approximating the application of a targeted image processing operator to the input image; wherein the CNN is trained on pairs of training input images and training output images, the training output images generated by application of the targeted image processing operator to the training input images; and wherein the CNN training generates a set of bias parameters and a set of convolutional kernel parameters to be employed by the CNN for processing of intermediate image layers associated with processing stages between the input image and the output image, each of the processing stages associated with one of the sequence of non-linear operations, the bias and convolutional kernel parameters associated with the targeted image processing operator.

Example 2 includes the subject matter of Example 1, further comprising performing aggregation of contextual information over pixels of the intermediate image layers.

Example 3 includes the subject matter of Examples 1 or 2, wherein the aggregation of contextual information further comprises applying a dilated convolution operator in the processing stage of one or more of the intermediate image layers, the dilated convolution operator based on a distance scale factor that increases exponentially for each of the intermediate image layers.

Example 4 includes the subject matter of any of Examples 1-3, wherein resolution of the intermediate image layers and resolution of the output image is equal to resolution of the input image.

Example 5 includes the subject matter of any of Examples 1-4, wherein the non-linear operation comprises a Leaky Rectified Linear Unit (LReLU) operation.

Example 6 includes the subject matter of any of Examples 1-5, wherein the CNN training further comprises generating the bias parameters and the convolutional kernel parameters based on a minimization of mean-squared-error between the CNN output image approximation and the training output images.

Example 7 includes the subject matter of any of Examples 1-6, wherein the CNN training further comprises performing a randomized resolution resizing operation on the training input images.

Example 8 includes the subject matter of any of Examples 1-7, wherein the targeted image processing operator is one of de-noising, de-blurring, variational image smoothing, adaptive tone and detail enhancement, photographic style transfer, non-photorealistic stylization, de-mosaicking, and nonlocal dehazing.

Example 9 is a system for approximating an image processing operator. The system comprises: an image operator approximation circuit including a convolutional neural network (CNN) to perform a sequence of non-linear operations on an input image to generate an output image, the output image approximating the application of a targeted image processing operator to the input image; wherein the CNN is trained on pairs of training input images and training output images, the training output images generated by a CNN training circuit to apply the targeted image processing operator to the training input images; and wherein the CNN training circuit generates a set of bias parameters and a set of convolutional kernel parameters to be employed by the CNN for processing of intermediate image layers associated with processing stages between the input image and the output image, each of the processing stages associated with one of the sequence of non-linear operations, the bias and convolutional kernel parameters associated with the targeted image processing operator.

Example 10 includes the subject matter of Example 9, wherein the image operator approximation circuit further comprises an image layer processing circuit to aggregate contextual information over pixels of the intermediate image layers by applying a dilated convolution operator in the processing stage of one or more of the intermediate image layers.

Example 11 includes the subject matter of Examples 9 or 10, wherein the image operator approximation circuit further comprises a dilation factor update circuit to update a distance scale factor of the dilated convolution operator, the distance scale factor to increase exponentially for each of the intermediate image layers.

Example 12 includes the subject matter of any of Examples 9-11, wherein resolution of the intermediate image layers and resolution of the output image is equal to resolution of the input image.

Example 13 includes the subject matter of any of Examples 9-12, wherein the non-linear operation comprises a Leaky Rectified Linear Unit (LReLU) operation.

Example 14 includes the subject matter of any of Examples 9-13, wherein the CNN training circuit further comprises a mean-squared error (MSE) minimization circuit to generate the bias parameters and the convolutional kernel parameters based on a minimization of mean-squared-error between the CNN output image approximation and the training output images.

Example 15 includes the subject matter of any of Examples 9-14, wherein the CNN training circuit further comprises a randomized resolution resizing circuit to perform a randomized resolution resizing operation on the training input images.

Example 16 includes the subject matter of any of Examples 9-15, wherein the targeted image processing operator is one of de-noising, de-blurring, variational image smoothing, adaptive tone and detail enhancement, photographic style transfer, non-photorealistic stylization, de-mosaicking, and nonlocal dehazing.

Example 17 is at least one non-transitory computer readable storage medium having instructions encoded thereon that, when executed by one or more processors, result in the following operations for approximating an image processing operator. The operations comprise: performing, by a convolutional neural network (CNN), a sequence of non-linear operations on an input image to generate an output image, the output image approximating the application of a targeted image processing operator to the input image; wherein the CNN is trained on pairs of training input images and training output images, the training output images generated by application of the targeted image processing operator to the training input images; and wherein the CNN training generates a set of bias parameters and a set of convolutional kernel parameters to be employed by the CNN for processing of intermediate image layers associated with processing stages between the input image and the output image, each of the processing stages associated with one of the sequence of non-linear operations, the bias and convolutional kernel parameters associated with the targeted image processing operator.

Example 18 includes the subject matter of Example 17 further comprising the operation of aggregating contextual information over pixels of the intermediate image layers.

Example 19 includes the subject matter of Example 17 or 18, wherein the aggregation of contextual information further comprises the operation of applying a dilated convolution operator in the processing stage of one or more of the intermediate image layers, the dilated convolution operator based on a distance scale factor that increases exponentially for each of the intermediate image layers.

Example 20 includes the subject matter of any of Examples 17-19, wherein resolution of the intermediate image layers and resolution of the output image is equal to resolution of the input image.

Example 21 includes the subject matter of any of Examples 17-20, wherein the non-linear operation comprises a Leaky Rectified Linear Unit (LReLU) operation.

Example 22 includes the subject matter of any of Examples 17-21, wherein the CNN training further comprises the operation of generating the bias parameters and the convolutional kernel parameters based on a minimization of mean-squared-error between the CNN output image approximation and the training output images.

Example 23 includes the subject matter of any of Examples 17-22, wherein the CNN training further comprises the operation of performing a randomized resolution resizing operation on the training input images.

Example 24 includes the subject matter of any of Examples 17-23, wherein the targeted image processing operator is one of de-noising, de-blurring, variational image smoothing, adaptive tone and detail enhancement, photographic style transfer, non-photorealistic stylization, de-mosaicking, and nonlocal dehazing.

Example 25 is a system for approximating an image processing operator. The system comprises: means for performing, by a convolutional neural network (CNN), a sequence of non-linear operations on an input image to generate an output image, the output image approximating the application of a targeted image processing operator to the input image; wherein the CNN is trained on pairs of training input images and training output images, the training output images generated by application of the targeted image processing operator to the training input images; and wherein the CNN training generates a set of bias parameters and a set of convolutional kernel parameters to be employed by the CNN for processing of intermediate image layers associated with processing stages between the input image and the output image, each of the processing stages associated with one of the sequence of non-linear operations, the bias and convolutional kernel parameters associated with the targeted image processing operator.

Example 26 includes the subject matter of Example 25, further comprising means for performing aggregation of contextual information over pixels of the intermediate image layers.

Example 27 includes the subject matter of Examples 25 or 26, wherein the aggregation of contextual information further comprises means for applying a dilated convolution operator in the processing stage of one or more of the intermediate image layers, the dilated convolution operator based on a distance scale factor that increases exponentially for each of the intermediate image layers.

Example 28 includes the subject matter of any of Examples 25-27, wherein resolution of the intermediate image layers and resolution of the output image is equal to resolution of the input image.

Example 29 includes the subject matter of any of Examples 25-28, wherein the non-linear operation comprises a Leaky Rectified Linear Unit (LReLU) operation.

Example 30 includes the subject matter of any of Examples 25-29, wherein the CNN training further comprises means for generating the bias parameters and the convolutional kernel parameters based on a minimization of mean-squared-error between the CNN output image approximation and the training output images.

Example 31 includes the subject matter of any of Examples 25-30, wherein the CNN training further comprises means for performing a randomized resolution resizing operation on the training input images.

Example 32 includes the subject matter of any of Examples 25-31, wherein the targeted image processing operator is one of de-noising, de-blurring, variational image smoothing, adaptive tone and detail enhancement, photographic style transfer, non-photorealistic stylization, de-mosaicking, and nonlocal dehazing.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A method for approximating an image processing operator, the method comprising:
    performing, by a convolutional neural network (CNN), a sequence of non-linear operations on an input image to generate an output image, the output image approximating the application of a targeted image processing operator to the input image;
    wherein the CNN is trained on pairs of training input images and training output images, the training output images generated by application of the targeted image processing operator to the training input images; and
    wherein the CNN training generates a set of bias parameters and a set of convolutional kernel parameters to be employed by the CNN for processing of intermediate image layers associated with processing stages between the input image and the output image, each of the processing stages associated with one of the sequence of non-linear operations, the bias and convolutional kernel parameters associated with the targeted image processing operator.

2. The method of claim 1, further comprising performing aggregation of contextual information over pixels of the intermediate image layers.

3. The method of claim 2, wherein the aggregation of contextual information further comprises applying a dilated convolution operator in the processing stage of one or more of the intermediate image layers, the dilated convolution operator based on a distance scale factor that increases exponentially for each of the intermediate image layers.

4. The method of claim 1, wherein resolution of the intermediate image layers and resolution of the output image is equal to resolution of the input image.

5. The method of claim 1, wherein the non-linear operation comprises a Leaky Rectified Linear Unit (LReLU) operation.

6. The method of claim 1, wherein the CNN training further comprises generating the bias parameters and the convolutional kernel parameters based on a minimization of mean-squared-error between the CNN output image approximation and the training output images.

7. The method of claim 1, wherein the CNN training further comprises performing a randomized resolution resizing operation on the training input images.

8. The method of claim 1, wherein the targeted image processing operator is one of de-noising, de-blurring, variational image smoothing, adaptive tone and detail enhancement, photographic style transfer, non-photorealistic stylization, de-mosaicking, and nonlocal dehazing.

9. A system for approximating an image processing operator, the system comprising:
    an image operator approximation circuit including a convolutional neural network (CNN) to perform a sequence of non-linear operations on an input image to generate an output image, the output image approximating the application of a targeted image processing operator to the input image;
    wherein the CNN is trained on pairs of training input images and training output images, the training output images generated by a CNN training circuit to apply the targeted image processing operator to the training input images; and
    wherein the CNN training circuit generates a set of bias parameters and a set of convolutional kernel parameters to be employed by the CNN for processing of intermediate image layers associated with processing stages between the input image and the output image, each of the processing stages associated with one of the sequence of non-linear operations, the bias and convolutional kernel parameters associated with the targeted image processing operator.

10. The system of claim 9, wherein the image operator approximation circuit further comprises an image layer processing circuit to aggregate contextual information over pixels of the intermediate image layers by applying a dilated convolution operator in the processing stage of one or more of the intermediate image layers.

11. The system of claim 10, wherein the image operator approximation circuit further comprises a dilation factor update circuit to update a distance scale factor of the dilated convolution operator, the distance scale factor to increase exponentially for each of the intermediate image layers.

12. The system of claim 9, wherein resolution of the intermediate image layers and resolution of the output image is equal to resolution of the input image.

13. The system of claim 9, wherein the non-linear operation comprises a Leaky Rectified Linear Unit (LReLU) operation.

14. The system of claim 9, wherein the CNN training circuit further comprises a mean-squared error (MSE) minimization circuit to generate the bias parameters and the convolutional kernel parameters based on a minimization of mean-squared-error between the CNN output image approximation and the training output images.

15. The system of claim 9, wherein the CNN training circuit further comprises a randomized resolution resizing circuit to perform a randomized resolution resizing operation on the training input images.

16. The system of claim 9, wherein the targeted image processing operator is one of de-noising, de-blurring, variational image smoothing, adaptive tone and detail enhancement, photographic style transfer, non-photorealistic stylization, de-mosaicking, and nonlocal dehazing.

17. At least one non-transitory computer readable storage medium having instructions encoded thereon that, when executed by one or more processors, result in the following operations for approximating an image processing operator, the operations comprising:

performing, by a convolutional neural network (CNN), a sequence of non-linear operations on an input image to generate an output image, the output image approximating the application of a targeted image processing operator to the input image;

wherein the CNN is trained on pairs of training input images and training output images, the training output images generated by application of the targeted image processing operator to the training input images; and wherein the CNN training generates a set of bias parameters and a set of convolutional kernel parameters to be employed by the CNN for processing of intermediate image layers associated with processing stages between the input image and the output image, each of the processing stages associated with one of the sequence of non-linear operations, the bias and convolutional kernel parameters associated with the targeted image processing operator.

18. The computer readable storage medium of claim 17, further comprising the operation of aggregating contextual information over pixels of the intermediate image layers.

19. The computer readable storage medium of claim 18, wherein the aggregation of contextual information further comprises the operation of applying a dilated convolution operator in the processing stage of one or more of the intermediate image layers, the dilated convolution operator based on a distance scale factor that increases exponentially for each of the intermediate image layers.

20. The computer readable storage medium of claim 17, wherein resolution of the intermediate image layers and resolution of the output image is equal to resolution of the input image.

21. The computer readable storage medium of claim 17, wherein the non-linear operation comprises a Leaky Rectified Linear Unit (LReLU) operation.

22. The computer readable storage medium of claim 17, wherein the CNN training further comprises the operation of generating the bias parameters and the convolutional kernel parameters based on a minimization of mean-squared-error between the CNN output image approximation and the training output images.

23. The computer readable storage medium of claim 17, wherein the CNN training further comprises the operation of performing a randomized resolution resizing operation on the training input images.

24. The computer readable storage medium of claim 17, wherein the targeted image processing operator is one of de-noising, de-blurring, variational image smoothing, adaptive tone and detail enhancement, photographic style transfer, non-photorealistic stylization, de-mosaicking, and nonlocal dehazing.

\* \* \* \* \*